United States Patent
Horng et al.

(10) Patent No.: US 7,697,621 B2
(45) Date of Patent: Apr. 13, 2010

(54) METHOD AND SYSTEM FOR POWER LOADING IMPLEMENTATION DETECTION IN BEAMFORMING SYSTEMS

(75) Inventors: Jyh Chau Horng, Saratoga, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1120 days.

(21) Appl. No.: 11/317,410

(22) Filed: Dec. 22, 2005

(65) Prior Publication Data
US 2007/0147534 A1 Jun. 28, 2007

(51) Int. Cl.
*H04K 1/10* (2006.01)
*H04L 27/28* (2006.01)

(52) U.S. Cl. .............. 375/260; 375/267; 375/299; 455/73; 455/403

(58) Field of Classification Search .......... 375/260, 375/267, 299; 455/73, 403
See application file for complete search history.

(56) References Cited

U.S. PATENT DOCUMENTS

| | | | |
|---|---|---|---|
| 5,119,042 A | 6/1992 | Crampton et al. | |
| 6,144,711 A | 11/2000 | Raleigh et al. | |
| 6,377,631 B1 | 4/2002 | Raleigh | |
| 6,452,981 B1 | 9/2002 | Raleigh et al. | |
| 6,754,286 B2 | 6/2004 | Hottinen et al. | |
| 6,763,237 B1 | 7/2004 | Katz | |
| 6,888,899 B2 | 5/2005 | Raleigh et al. | |
| 7,020,482 B2 | 3/2006 | Medvedev et al. | |
| 7,072,692 B1 | 7/2006 | Katz et al. | |
| 7,145,971 B2 | 12/2006 | Raleigh et al. | |
| 7,203,249 B2* | 4/2007 | Raleigh et al. | 375/299 |
| 7,336,727 B2* | 2/2008 | Mukkavilli et al. | 375/299 |
| 7,340,009 B2 | 3/2008 | Giannakis et al. | |
| 7,466,670 B2 | 12/2008 | Anderson et al. | |
| 7,505,529 B2 | 3/2009 | Kwak et al. | |
| 7,525,988 B2 | 4/2009 | Kim | |
| 7,542,515 B2 | 6/2009 | Li et al. | |
| 7,548,751 B2 | 6/2009 | Katori et al. | |
| 7,555,060 B2 | 6/2009 | Raleigh et al. | |
| 2005/0031047 A1* | 2/2005 | Maltsev et al. | 375/260 |
| 2005/0047517 A1 | 3/2005 | Georgios et al. | |
| 2005/0157810 A1* | 7/2005 | Raleigh et al. | 375/267 |
| 2006/0045193 A1 | 3/2006 | Stolpman et al. | |
| 2006/0093065 A1* | 5/2006 | Thomas et al. | 375/299 |

(Continued)

OTHER PUBLICATIONS

Mujtaba, S., "TGn Sync Proposal Technical Specification", Nov. 4, 2004, IEEE 802.11-04/889r1.*

(Continued)

*Primary Examiner*—Mohammad H Ghayour
*Assistant Examiner*—Sung Ahn
(74) *Attorney, Agent, or Firm*—Kenneth L. Sherman, Esq.; Michael Zarrabian, Esq.; Myers Andras Sherman LLP

(57) ABSTRACT

A method of detecting the power loadings at a receiver wherein estimation of power loadings based on the received reference signals is unnecessary. Channel condition is obtained for each channel and transmission power loading per channel is detected according to channel condition, wherein estimation of power loadings based on the received reference signals is unnecessary. A received encoded information bit stream is then decoded according to the detected power loading per channel.

24 Claims, 4 Drawing Sheets

U.S. PATENT DOCUMENTS

| | | |
|---|---|---|
| 2006/0104379 A1 | 5/2006 | Li et al. |
| 2006/0120469 A1 | 6/2006 | Maltsev et al. |
| 2006/0176993 A1 | 8/2006 | Kwun et al. |
| 2007/0147534 A1 | 6/2007 | Horng et al. |
| 2007/0153934 A1 | 7/2007 | Horng et al. |
| 2007/0258411 A1 | 11/2007 | Trigui |
| 2007/0270173 A1 | 11/2007 | Niu et al. |
| 2008/0232485 A1 | 9/2008 | Niu et al. |

OTHER PUBLICATIONS

G. J. Foschini, "Layered space-time architecture for wireless communication in a fading environment when using multi-element antennas," Bell Labs Tech. J., 1996, pp. 41-59, vol. 1, No. 2.

V. Tarokh, N. Seshadri, and A. R. Calderbank, "Space-time codes for high data rate wireless communications: Performance criterion and code construction," IEEE Trans. Inform. Theory, Mar. 1998, pp. 744-765, vol. 44, No. 2.

L. Zheng and D. Tse, "Diversity and multiplexing: a fundamental tradeoff in multiple-antenna channels," IEEE Trans. Info. Theory, May 2003, pp. 1073-1096, vol. 49, No. 5.

F. R. Farrokhi, G. J. Foschini, A. Lozano, and R. A. Valenzuela, "Link-optimal space-time processing with multiple transmit and receive antennas," IEEE Comm. Letters, Mar. 2001, pp. 85-87, vol. 5, No. 3.

H. Sampath, P. Stoica, and A. Paulraj, "Generalized linear precoder and decoder design for MIMO channels using the weighted MMSE criterion," IEEE Transactions on Communications, Dec. 2001, pp. 2198-2206, vol. 49, No. 12.

A. Scaglione, P. Stoica, S. Barbarossa G. B. Giannakis, and H. Sampath, "Optimal design for space-time linear precoders and decoders," IEEE Trans. Signal Processing, May 2002, pp. 1051-1064, vol. 50, No. 5.

U.S. Appl. No. 11/110,346, filed Apr. 19, 2005, Jyh Chau Horng et al.

U.S. Appl. No. 11/110,337, filed Apr. 19, 2005, Jyh Chau Horng et al.

Erceg, V. et al., "TGn channel models," a contribution to IEEE 802.11-03/940r2, Jan. 2004, pp. 1-44, US.

Mujtaba, S., "TGn Sync Proposal Technical Specification," a contribution to IEEE 802.11-04-889r7, Jul. 2005, pp. 1-133, US.

Mujtaba, S., "TGn Sync Proposal Technical Specification," a contribution to IEEE 802.11-04/889r0, Aug. 2004, pp. 1-135, US.

Ketchum, J. et al., "System Description and Operating Principles for High Throughput Enhancements to 802.11", a contribution to IEEE 802.11-04/0870r0, Aug. 2004, pp. 1-136, US.

Shiu, D. et al., "Fading Correlation and its Effect on the Capacity of Multi-Element Antenna Systems," IEEE Transactions on Communication, Mar. 2000, pp. 502-513, vol. 48, No. 3, Piscataway, NJ.

Van Veen, B. et al., "Beamforming: A Versatile Approach to Spatial Filtering," IEEE ASSP Magazine, Apr. 1988, pp. 4-24, vol. 5, No. 2, Piscataway, NJ.

U.S. Non-final Office Action for U.S. Appl. No. 11/321,267 mailed Oct. 1, 2008.

U.S. Final Office Action for U.S. Appl. No. 11/321,267 mailed Feb. 19, 2009.

U.S. Advisory Action for U.S. Appl. No. 11/321,267 mailed Apr. 27, 2009.

U.S. Non-final Office Action for U.S. Appl. No. 11/321,267 mailed Jul. 7, 2009.

U.S. Non-final Office Action for U.S. Appl. No. 11/110,346 mailed Jun. 9, 2008.

U.S. Final Office Action for U.S. Appl. No. 11/110,346 mailed Nov. 28, 2008.

U.S. Non-final Office Action for U.S. Appl. No. 11/110,346 mailed Feb. 5, 2009.

U.S. Non-final Office Action for U.S. Appl. No. 11/110,337 mailed Jun. 5, 2008.

U.S. Final Office Action for U.S. Appl. No. 11/110,337 mailed Dec. 26, 2008.

U.S. Non-final Office Action for U.S. Appl. No. 11/314,928 mailed Jan. 21, 2009.

U.S. Non-final Office Action for U.S. Appl. No. 11/314,928 mailed Aug. 12, 2009.

* cited by examiner

METHOD AND SYSTEM FOR POWER LOADING IMPLEMENTATION DETECTION IN BEAMFORMING SYSTEMS

FIELD OF THE INVENTION

The present invention relates generally to data communication, and more particularly, to power loading in multi-channel data communication systems such as multiple-input multiple-output (MIMO) systems.

BACKGROUND OF THE INVENTION

A multiple-input-multiple-output (MIMO) communication system employs multiple transmit antennas in a transmitter and multiple receive antennas in a receiver for data transmission. A MIMO channel formed by the transmit and receive antennas may be decomposed into independent channels, wherein each channel is a spatial sub-channel (or a transmission channel) of the MIMO channel and corresponds to a dimension. The MIMO system can provide improved performance (e.g., increased transmission capacity) if the additional dimensionalities created by the multiple transmit and receive antennas are utilized.

MIMO increases system link robustness and spectral efficiency. To optimize spectral efficiency for MIMO system, many efforts have been made, which can be broadly classified into two categorists: open-loop approaches and closed-loop approaches. The open-loop approaches include spatial multiplexing, space-time coding and the tradeoff therebetween them. The closed-loop approaches focus on maximizing the link capacity, which results in a "water-filling" solution, and on minimizing the weighted MMSE which provides an "inverse water-filling" solution.

In an open-loop MIMO system, the MIMO transmitter has no prior knowledge of the channel condition (i.e., channel state information). As such, space-time coding techniques are usually implemented in the transmitter to combat fading channels. In a closed-loop system, the channel state information (CSI) can be fed back to the transmitter from the receiver, wherein some pre-processing can be performed at the transmitter in order to separate the transmitted data streams at the receiver side.

Such techniques are referred to as beamforming techniques, which provide better performance in desired receiver's directions and suppress the transmit power in other directions. Beamforming techniques are considered for IEEE 802.11n (high throughput WLAN) standard. Closed-loop eigen-beamforming generally provides higher system capacity compared with the closed-loop solution, assuming the transmitter knows the down-link channel. Singular vector decomposition (SVD) based eigen-beamforming decomposes the correlated MIMO channel into multiple parallel pipes.

When applying the closed-loop approach to MIMO-OFDM (orthogonal frequency division multiplexing), the optimal solution requires a bit loading and power loading per OFDM subcarrier. In order to simplify the complexity, commonly assigned patent applications Ser. No. 11/110,346, filed Apr. 19, 2005, entitled "Power Loading Method and Apparatus for Throughput Enhancement in MIMO systems," and patent application Ser. No. 11/110,337, filed Apr. 19, 2005, entitled "A Method and Apparatus for Quantization and Detection of Power Loadings in MIMO Beamforming System," incorporated herein by reference, provide adapting coding/modulation and power level across all subcarriers, fixing coding/modulation for all data streams and only adjusting the uneven power level for all OFDM symbols. In such methods, the receiver needs to know the power loadings before decoding the received signals. Therefore, the transmitter needs to acknowledge the receiver about the power loadings used at the transmitter, or the receiver needs to do automatic detection to estimate the power loading values based on the received reference signals.

BRIEF SUMMARY OF THE INVENTION

In one embodiment the present invention provides a method of automatically detecting the power loadings at the receiver wherein estimation of power loadings based on the received reference signals is unnecessary. The present invention is applicable to power loading methods which are calculated based on the channel eigenvalues. The present invention is also applicable to quantized power loading cases.

As such, in one implementation, the present invention provides a closed-loop signaling method over multiple channels in a telecommunication system, comprising the steps of: obtaining channel condition for each channel; detecting transmission power loading per channel according to channel condition, wherein estimation of power loadings based on the received reference signals is unnecessary; and decoding a received encoded information bit stream according to the detected power loading per channel.

The step of detecting transmission power loading further includes the steps of: determining rank-ordered channel eigenvalues based on the channel matrix; determining un-quantized power loadings; and determining quantized power loadings based on the un-quantized power loadings.

In another implementation the present invention provides a telecommunication system, comprising: a wireless transmitter and a receiver, wherein the transmitter transmits data streams via multiple channels over a plurality of antennas to the receiver by selecting transmission power loading per channel, and the receiver detects transmission power loading per channel according to channel condition, wherein estimation of power loadings based on the received reference signals is unnecessary. The receiver further obtains channel condition for each channel, detects transmission power loading per channel according to channel condition, wherein estimation of power loadings based on the received reference signals is unnecessary, and decodes a received encoded information bit stream according to the detected power loading per channel. Preferably, the receiver detects transmission power loading by further determining rank-ordered channel eigenvalues based on the channel matrix, determining un-quantized power loadings, and determining quantized power loadings based on the un-quantized power loadings.

These and other features, aspects and advantages of the present invention will become understood with reference to the following description, appended claims and accompanying figures.

DETAILED DESCRIPTION OF THE INVENTION

Figure 1:
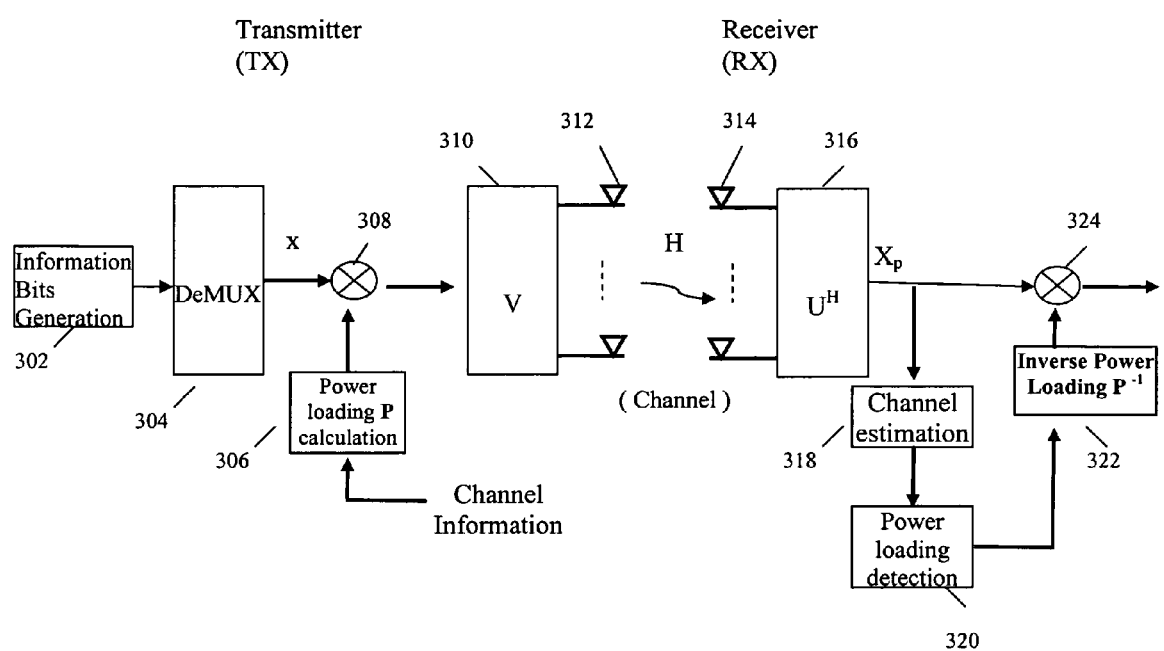
FIG. 1 shows a functional block diagram of a MIMO system implementing un-quantized uneven power loading and detection.

FIG. 1 shows a functional block diagram of a MIMO system 300 which implements un-quantized uneven power loading and detection according to said commonly assigned patent application Ser. No. 11/110,337, filed Apr. 19, 2005, entitled: "A Method and Apparatus for Quantization and Detection of Power Loadings in MIMO Beamforming System." The system 300 comprises a transmitter TX and a receiver RX. The transmitter TX includes an information bits generation unit 302, a demultiplexer 304, a power loading calculation unit 306, a multiplication unit 308, a V function unit 310, and transmit antennas 312. The receiver RX includes receiver antennas 314, a $U^H$ function unit 316, a channel estimation unit 318, a power loading detection unit 330, an inverse power loading unit 322 and a multiplier 324.

The system 300 provides adapting coding/modulation and power level across all subcarriers, fixing coding/modulation for all data streams and only adjusting the uneven power level for all OFDM symbols. The receiver needs to know the power loadings before decoding the received signals. Therefore, the transmitter needs to acknowledge the receiver about the power loadings used at the transmitter, or the receiver needs to do automatic detection to estimate the power loading values based on the received reference signals.

In one embodiment the present invention provides a method of automatically detecting the power loadings at the receiver wherein estimation of power loadings based on the received reference signals is unnecessary. The present invention is applicable to power loading methods which are calculated based on the channel eigenvalues. The present invention is also applicable to quantized power loading cases.

For channel eigenvalue-based algorithms for power loading calculation (such as a reverse water filling method described in the above mentioned commonly assigned patent applications) the receiver can estimate the power loading based on the channel eigenvalues. The channel eigenvalues are calculated from the estimated channel matrix H at the receiver. Assuming the power loading $\alpha_i$ at the ith channel is a function of channel eigenvalues $\lambda_i$, $i=1, 2, \ldots, N_{ss}$. At the receiver, the power loadings can be estimated by performing the f function operations on the channel eigenvalues, as in relation (1) below:

$$\alpha_i = f(\lambda_1, \lambda_2, \ldots, \lambda_{N_{ss}}) \quad (1)$$

This method is also applicable to quantized power loading cases (one such quantized power loading case is described in the above mentioned commonly assigned patent applications).

In the reverse water filling method described in the above mentioned commonly assigned patent applications, the un-quantized power loadings $\alpha_i$ are calculated according to relation (2) below:

$$\alpha_i = \frac{P_{total}}{\lambda_i \sum_{j=1}^{N_{ss}} \frac{1}{\lambda_j}} \quad (2)$$

where $N_{ss}$ is the number of spatial data streams and $P_{total}$ is a fixed number representing total power. The quantized power loadings $P_i$ are calculated according to relation (3) below:

$$P_i = Q[\alpha_i] \quad (3)$$

wherein $Q(\cdot)$ is a quantization function.

According to an embodiment of the present invention, the process for detecting $P_i$ at the receiver includes the steps of:

1. Calculate rank-ordered channel eigenvalues $\lambda_i$, $i=1, 2, \ldots, N_{ss}$, from the estimated channel matrix H based on sent packets, where $\lambda$ are the eigenvalues of the matrix HH* and the $(\cdot)^*$ is the Hermitian operation.
2. Calculate $\alpha_i$ based on relation (2) above.
3. Calculate $P_i$, which are the nearest quantized values of $\alpha_i$. Here the same quantizer is used as in the transmitter.

Figure 2:
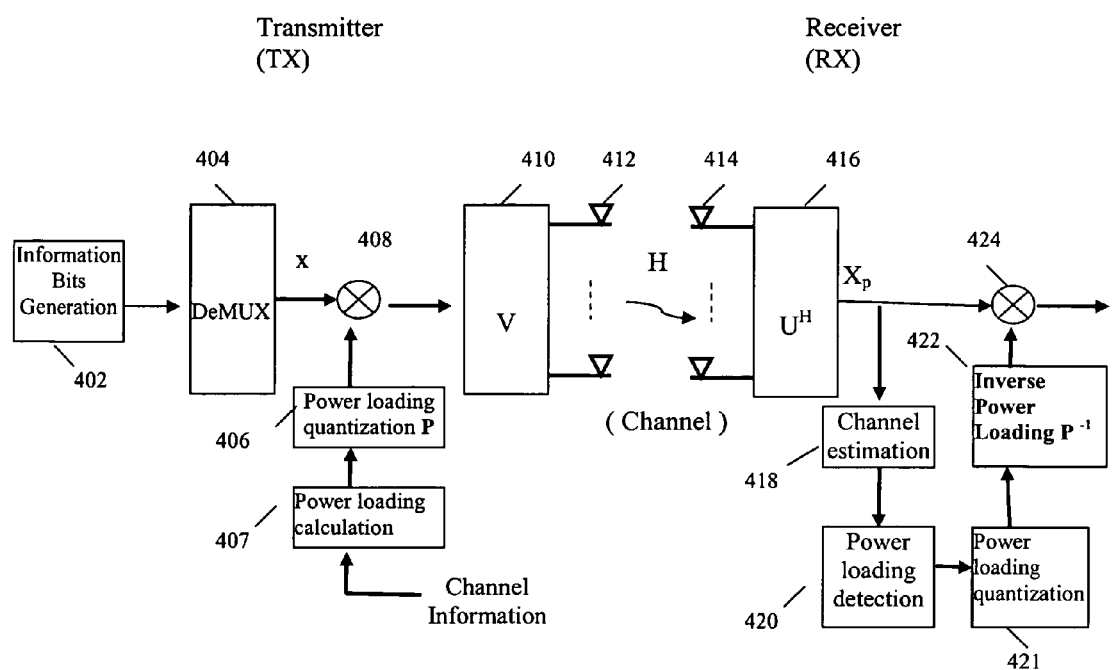
FIG. 2 shows a functional block diagram of a MIMO system implementing quantized uneven power loadings and detection according to an embodiment of the present invention.

FIG. 2 shows a functional block diagram of a MIMO system 400 which implements quantized uneven power loadings and detection according to an embodiment of the present invention. The system 400 comprises a transmitter TX and a receiver RX. The transmitter TX includes an information bits generation unit 402, a demultiplexer 404, a power loading quantization unit 406, a power loading calculation unit 407, a multiplication unit 408, a V function unit 410, and transmit antennas 412. The receiver RX includes receiver antennas 414, a $U^H$ function unit 416, a channel estimation unit 418, a power loading detection unit 420 (detailed by example in detector 100 of FIG. 3, described below), a power loading quantization unit 421, an inverse power loading unit 422 and a multiplier 424.

Figure 3:
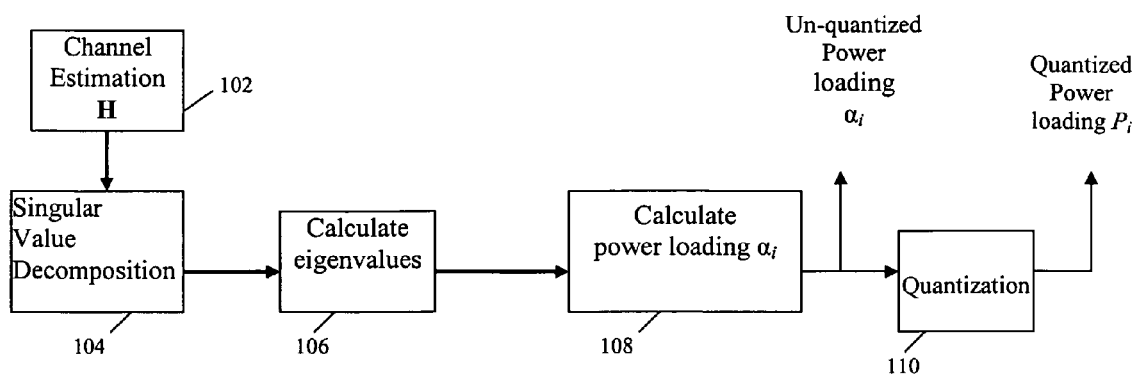
FIG. 3 shows a functional block diagram of a detector for detecting power loading at a receiver according to an embodiment of the present invention.

FIG. 3 shows a block diagram of an embodiment of a power loading detector 100 for detecting $P_i$ at the receiver RX according to an embodiment of the present invention. The detector 100 includes a channel estimation unit 102, an SVD unit 104, an eigenvalue calculation unit 106, a power loading calculation unit 108 and a quantizer 110. The channel estimation unit 102 estimates the channel H, the SVD unit 104 determines $H=UDV^H$ where U and V are unitary matrices and D is a diagonal matrix with elements equal to the square-root of eigenvalues of the matrix HH*, where $(\cdot)^*$ is the Hermitian operation, the eigenvalue calculation unit 106 determines eigenvalues $\lambda_i = D_{ii}^2$, the power loading calculation unit 106 determines the un-quantized power loading $\alpha_i$ from relation (2) above, and the quantizer 110 determines the quantized power loading $P_i$ according to relation (3) above.

An alternative method for implementation of the power loading detector is described in the following to reduce the complexity in determining the un-quantized power loading and determining the quantized power loading, including the steps of:

1. Calculate and rank order channel eigenvalues $\lambda_i$, $i=1, 2, \ldots, N_{ss}$, in descending order from the estimated channel matrix H, where $\lambda$ are the eigenvalues of the matrix HH* and the $(\cdot)^*$ is the Hermitian operation.
2. For $i=1$, calculate $c_i = \lambda_{2i-1}/\lambda_{2i}$.
3. Find the quantized set $P=(P_1, P_2, \ldots, P_{Nss})$, from a set of power-loading sets pre-defined and fixed by the transmitter, with the smallest $|c_i - d_i|$ where $d_i = P_{Nss-2(i-1)}/P_{Nss-2i+1}$.
4. Repeat steps 2 and 3 with $i=i+1$, if multiple sets of P in step 3 exist and $i<Nss$.

For example, in a case where $N_{ss}=2$ and 2-bit quantization, then the pre-defined power loading set $P=\{(P_1, P_2): 0.4, 1.6), (0.7, 1.3)\}$ for quantized power loading values, which are under the fixed power constraint. If the transmitter chooses $(P_1, P_2) =(0.4, 1.6)$ as the power loading pair, and the estimated channel has eigenvalues (3.6, 1.2) at the receiver. From step 2, $c_1=3.6/1.2 =3$. Therefore, the selection is $(P_1, P_2)=(0.4, 1.6)$, because its $d_1=(P_2/P_1)=4$ is near $c_1=3$, rather than the other pair with $d_1=(1.3/0.7)=1.86$. Since only one set of power loading pair exists, no repetitions of step 2 and 3 are necessary.

Figure 4:
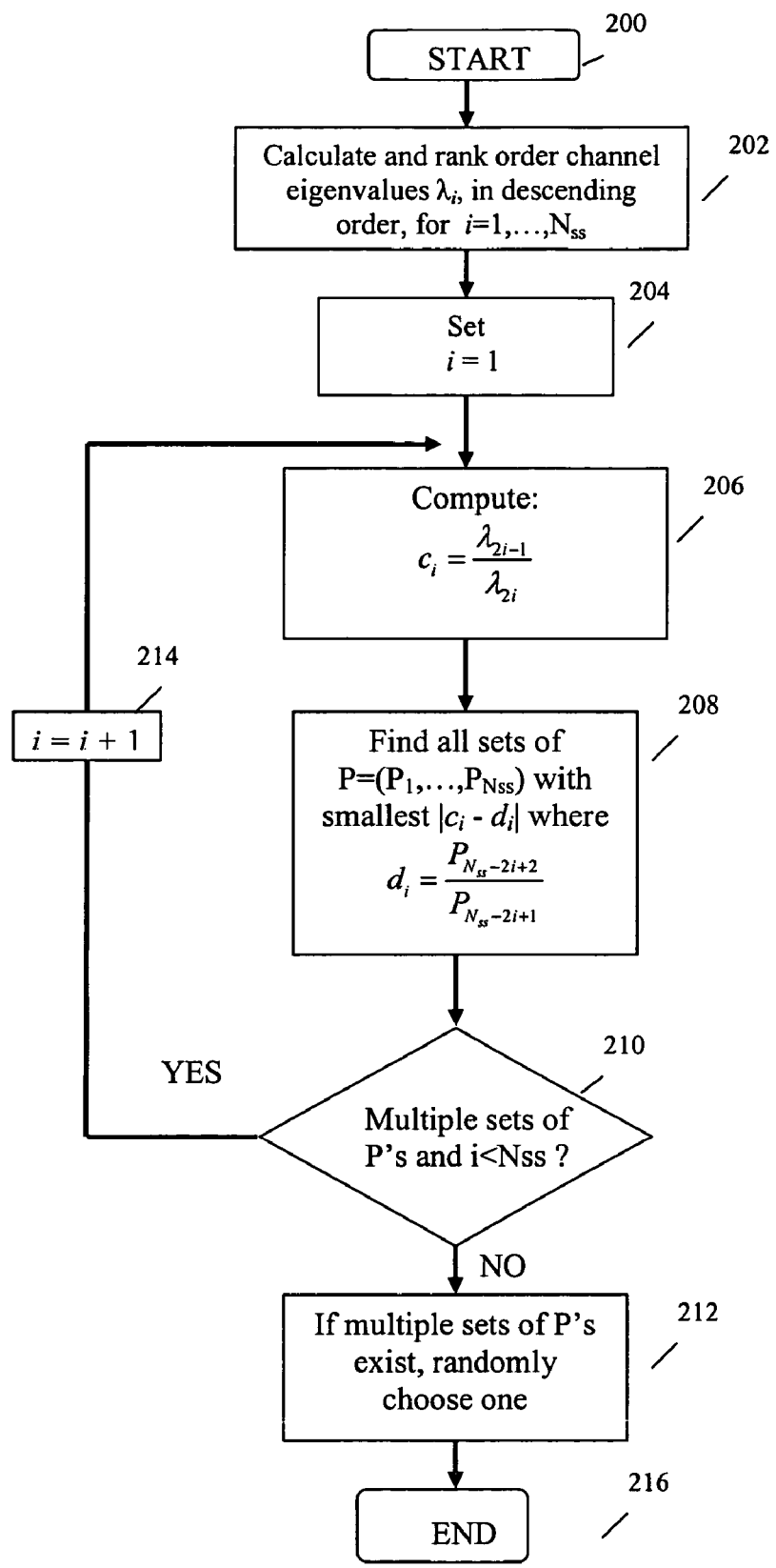
FIG. 4 shows a flowchart of the steps of quantized power loading detection according to an embodiment of the present invention.

FIG. 4 shows a flowchart of an implementation of the abovementioned alternative method of quantized power loading detection, according to the present invention, including the steps of:
Step 200: Start,
Step 202: Calculate and rank order channel eigenvalues $\lambda_i$, in descending order, for i=1, . . . , $N_{ss}$,
Step 204: set i=1,
Step 206: Compute $$c_i = \frac{\lambda_{2i-1}}{\lambda_{2i}},$$

Step 208: Find all P=($P_1$, . . . , $P_{NSS}$) with smallest $|c_i\text{-}d_i|$, from all pre-defined quantized power loading sets, where $$d_i = \frac{P_{Nss-2i+2}}{P_{Nss-2i+1}},$$

Step 210: Determine if multiple sets of P's exist and i<Nss,
Step 214: If so, i =i +1, and proceed back to step 206.
Step 212: Otherwise, if multiple sets of P's still exist, randomly choose one,
Step 216: The process is completed.

Because according to the present invention there is no need to transmit the reference signal for power loading detection, system complexity is reduced. Further, the above methods can be implemented at the transmitter for quantized power loading selections.

The present invention has been described in considerable detail with reference to certain preferred versions thereof; however, other versions are possible. Therefore, the spirit and scope of the appended claims should not be limited to the description of the preferred versions contained herein.

What is claimed is:

1. A closed-loop signaling method over multiple channels in a telecommunication system, comprising:
   obtaining channel condition for each channel in a channel matrix;
   detecting transmission power loading per channel according to channel condition, wherein estimation of power loadings based on received reference signals is unnecessary;
   determining rank-ordered channel eigenvalues based on the channel matrix;
   determining un-quantized power loadings;
   determining quantized power loadings based on the un-quantized power loadings, wherein determining the quantized power loadings further includes:
   (a) for i=1, calculating $c_i=\lambda_{2i-1}/\lambda_{2i}$,
   (b) finding a quantized power loading set P=($P_1, P_2, \ldots, P_{Nss}$), from a set of power-loading sets pre-defined and fixed by a transmitter, with a smallest $|c_i\text{-}d_i|$ where $d_i=P_{Nss-2(i-1)}/P_{Nss-2i+1}$;
   (c) repeating (a) and (b) with i=i+1, if multiple sets of P exist and i<Nss; and
   decoding a received encoded information bit stream according to the detected power loading per channel.

2. The method of claim 1, wherein determining the rank-ordered channel eigenvalues further includes:
   calculating and ranking channel eigenvalues $\lambda_i$, in descending order for i=1,2, . . . , $N_{ss}$, from the estimated channel matrix H, where $\lambda$ are the eigenvalues of the matrix HH* and the (·)* is the Hermitian operation, and $N_{ss}$ is a number of spatial data streams.

3. The method of claim 2 wherein determining the un-quantized power loadings further includes:
   calculating un-quantized power loadings $\alpha_i$ as:

$$\alpha_i = \frac{P_{total}}{\lambda_i \sum_{j=1}^{N_{ss}} \frac{1}{\lambda_j}},$$

wherein $P_{total}$ is a fixed value representing total power.

4. The method of claim 3 wherein determining the quantized power loadings further includes:
   calculating the quantized power loadings $P_i$ as nearest quantized values of $\alpha_i$.

5. The method of claim 1 wherein the communication system is a multiple input multiple output (MIMO) wireless communication system.

6. The method of claim 1 wherein the telecommunication system comprises the transmitter including multiple antennas, the method further comprises selecting an antenna transmission power loading for each channel based on channel condition.

7. The method of claim 1 wherein obtaining the channel condition further includes determining an eigenvalue for each channel.

8. The method of claim 6 wherein selecting the power loading further includes allocating transmission power to the multiple channels based on channel eigenvalues.

9. The method of claim 8 further including a receiver estimating power loading selections of the transmitter.

10. The method of claim 1 wherein the telecommunication system comprises a wireless orthogonal frequency division multiplexing (OFDM) system.

11. A telecommunication system, comprising:
    a wireless transmitter and a receiver, wherein the transmitter transmits data streams via multiple channels over a plurality of antennas to the receiver by selecting transmission power loading per channel, and
    the receiver detects transmission power loading per channel according to channel condition, and determines a quantized power loading set from a smallest value difference determined from eigenvalues and quantized power loadings, wherein the receiver determines quantized power loading $P_i$ by further performing:
    (a) for i=1, calculating $c_i=\lambda_{2i-1}/\lambda_{2i}$,
    (b) finding the quantized power loading set P=($P_1$, $P_2$, . . . , $P_{Nss}$), from a set of power-loading sets pre-defined and fixed by a transmitter, with a smallest $|c_i\text{-}d_i|$ where $d_i=P_{Nss-2(i-1)}/P_{Nss-2i+1}$,
    (c) repeating (a) and (b) with i=i+1, if multiple sets of P exist and i<Nss; and
    estimation of power loadings based received reference signals is unnecessary.

12. The system of claim 11 wherein the receiver further obtains channel condition for each channel, detects transmission power loading per channel according to channel condition, wherein estimation of power loadings based on the received reference signals is unnecessary, and decodes a received encoded information bit stream according to the detected power loading per channel.

13. The system of claim 11 wherein the transmitter is a multiple input multiple output (MIMO) transmitter.

14. The system of claim 11, wherein the receiver detects transmission power loading by further determining rank-ordered channel eigenvalues based on a channel matrix, determining un-quantized power loadings, and determining quantized power loadings based on the un-quantized power loadings.

15. The system of claim 14, wherein the receiver determines rank-ordered channel eigenvalues further by calculating rank-ordered channel eigenvalues $\lambda_i$, in descending order for i=, 1, 2, . . . , $N_{ss}$ from the estimated channel matrix H, where $\lambda$ are the eigenvalues of the matrix HH* and the (·)* is the Hermitian operation, and $N_{ss}$ is the number of spatial data streams.

16. The system of claim 15 wherein the receiver determines un-quantized power loadings by further calculating un-quantized power loadings $\alpha_i$ as:

$$\alpha_i = \frac{P_{total}}{\lambda_i \sum_{j=1}^{N_{ss}} \frac{1}{\lambda_j}},$$

wherein $P_{total}$ is a fixed value representing total power.

17. The system of claim 16 wherein the receiver determines quantized power loadings by further calculating the quantized power loadings $P_i$ as nearest quantized values of $\alpha_i$.

18. The system of claim 11 wherein the telecommunication system is a multiple input multiple output (MIMO) wireless communication system.

19. The system of claim 11 wherein the telecommunication system comprises the transmitter including multiple antennas and antenna transmission power loading for each channel is selected based on channel condition.

20. The system of claim 11 wherein the channel condition is obtained determining an eigenvalue for each channel.

21. The system of claim 19 wherein the power loading is selected by allocating transmission power to the multiple channels based on channel eigenvalues.

22. The system of claim 19 wherein the receiver estimates power loading selections of the transmitter.

23. The system of claim 11 wherein telecommunication system comprises a wireless Orthogonal Frequency Division Multiplexing (OFDM) system.

24. A closed-loop signaling method over multiple channels in a telecommunication system, comprising:

obtaining channel condition for each channel;

detecting transmission power loading per channel according to channel condition, wherein estimation of power loadings based on received reference signals is unnecessary, and detecting the transmission power loading further includes:

determining rank-ordered channel eigenvalues based on a channel matrix, and determining the rank-ordered channel eigenvalues further includes:

calculating and ranking channel eigenvalues $\lambda_i$, in descending order for i=1,2, . . . , $N_{ss}$, from the estimated channel matrix H, where $\lambda$ are the eigenvalues of the matrix HH* and the (·)* is the Hermitian operation, and $N_{ss}$ is a number of spatial data streams;

determining un-quantized power loadings;

determining quantized power loadings based on the un-quantized power loadings, wherein determining quantized power loadings set P further includes:

(a) for i=1, calculating $c_i = \lambda_{2i-1}/\lambda_{2i}$, (b) finding the quantized power loading set P=($P_1$, $P_2$, . . . , $P_{Nss}$), from a set of power-loading sets pre-defined and fixed by a transmitter, with a smallest $|c_i - d_i|$ where $d_i = P_{Nss-2(i-1)}/P_{Nss-2i+1}$, (c) repeating (a) and (b) with i=i+1, if multiple sets of P exist and i<Nss; and decoding a received encoded information bit stream according to the detected power loading per channel.

* * * * *